United States Patent [19]
Tsui

[11] Patent Number: 5,497,161
[45] Date of Patent: Mar. 5, 1996

[54] ANGLE OF ARRIVAL (AOA) SOLUTION USING A SINGLE RECEIVER

[75] Inventor: David C. Tsui, Centerville, Ohio

[73] Assignee: The United States of America as represented by the Secretary of the Air Force, Washington, D.C.

[21] Appl. No.: 330,162

[22] Filed: Oct. 26, 1994

[51] Int. Cl.$^6$ .............................. G01S 13/06; G01R 23/00
[52] U.S. Cl. ........................... 342/147; 342/13; 342/192; 342/196; 342/417; 342/445; 324/76.19; 324/76.21; 324/76.23; 324/76.35
[58] Field of Search .................................. 342/147, 156, 342/157, 158, 174, 192, 196, 417, 445, 13; 324/76.19, 76.21, 76.23, 76.24, 76.35

[56]  References Cited

U.S. PATENT DOCUMENTS

| | | | |
|---|---|---|---|
| 4,612,545 | 9/1986 | Asendorf et al. | 342/16 |
| 4,996,533 | 2/1991 | May et al. | 342/108 |
| 5,102,219 | 4/1992 | Skagerlund | 356/5 |
| 5,198,748 | 4/1993 | Tsui et al. | 324/76.35 |
| 5,235,287 | 8/1993 | Sanderson et al. | 324/76.35 |
| 5,262,837 | 11/1993 | Shyy | 356/5 |
| 5,280,288 | 1/1994 | Sherry et al. | 342/83 |
| 5,293,114 | 3/1994 | McCormick et al. | 342/196 X |
| 5,315,307 | 5/1994 | Tsui et al. | 342/444 |
| 5,323,103 | 6/1994 | Choate et al. | 342/13 X |
| 5,367,539 | 11/1994 | Copley | 375/100 |
| 5,424,631 | 6/1995 | Ward | 324/76.19 |

Primary Examiner—John B. Sotomayor
Attorney, Agent, or Firm—Bernard E. Franz; Thomas L. Kundert

[57]  ABSTRACT

A solution to the AOA problem is provided, receiving the data via a plurality of antennas, which uses a switching network to couple the antennas to a single receiver and a single analog-to-digital converter to digitize the incoming signal. It is possible to solve the problem where there might be multiple signals present. In the receiver, the incident radiation is mixed with a local oscillator signal and down converted to an intermediate frequency (IF). This IF signal is discretely sampled in the analog-to-digital converter, and further processing is done using digital techniques. The incoming signal has to be phase compared to obtain the angle of arrival. Different delay times are used to receive the digital data from the different antennas at the same sampling times, with the data aligned according to the time axis. The frequency of the incoming signals can then be detected by performing a Fast Fourier Transform (FFT) on the data from one antenna with respect to time. Once the primary frequencies are determined, one can find the related amplitudes of the data from the other antennas. An FFT can then be performed on the amplitude values found. The output of this FFT gives the phase information related to the incoming signals and thus the solution to the AOA problem.

3 Claims, 2 Drawing Sheets

ANGLE OF ARRIVAL (AOA) SOLUTION USING A SINGLE RECEIVER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to the field of instantaneous frequency measurement receivers with digital processing, and more particularly to an angle-of-arrival (AOA) solution using a single digital channelized IFM receiver.

The conventional IFM receiver is a radio frequency receiver used primarily in electronic warfare. Its basic function is to measure the frequency of pulsed signals radiated from hostile radar. Generally, it may be said that IFM receivers measure the frequencies of incoming RF signals utilizing interferometric techniques by detecting the phase shift magnitudes produced in multiple, calibrated delay lines. For instance, the received RF signal is divided and simultaneously introduced into a non-delayed path and a delay line of known length. Since the delayed and non-delayed receiver paths are functions of the input signal frequency, conversion of the phase difference signals to video signals provides signals whose amplitudes are related to phase delay. These signals typically take the form of sin $\omega\tau$ or cos $\omega\tau$, where $\omega$ is the angular frequency or the processed input signal, and $\tau$ is the known time delay. The sin $\omega\tau$ and cos $\omega\tau$ signals are delivered to an encoding network which makes amplitude comparisons of the signals, determines the numerical value of $\omega$, and generates the digital frequency descriptive word.

An IFM receiver has many attractive features necessary for electronic warfare applications, such as small size, light weight, wide instantaneous bandwidth, and fine frequency resolution.

In a digital receiver, the incident radiation is mixed with a local oscillator signal and down converted to an intermediate frequency (IF). This IF signal is discretely sampled and further processing is done using digital techniques. The frequency of the incident radiation may be determined by performing a discrete Fourier transform on the sampled signal.

The following U.S. Pat. Nos. are of interest.

5,280,288—Sherry et al 5,262,837—Shvy 5,235,287—Sanderson et al 5,198,748—Tsui et al 5,102,219—Skagerlund 4,996,533—May et al The patent to May et al discloses a method for mapping ocean currents using a linear array of antennas each with its own receiver/digitizer system. The summing and phasing of the signals is done using two successive complex Fourier transforms. The patents to Sanderson et al and Tsui et al disclose the use of sample signals being further transformed and the phase and amplitudes calculated. The patent to Sherry et al discloses the use of Fast Fourier Transform in target detection systems. The patents to Skagerlund and Shvy disclose digitization of the received signals.

In solving the AOA problem, an analog signal is processed by multiple antennas and receivers. The incoming signal has to be phase compared to obtain the angle of arrival as shown in FIG. 1. For such a system to operate properly, the receivers have to be phase matched which means that the phases of all receivers must be properly matched or calibrated. This method can handle only one signal.

It is possible to solve the angle of arrival of multiple signals if the data is received in digital format. FIG. 2 shows the arrangement of the expected data from m different antennas. One would like to receive the digital data from the m different antennas at the same sampling times, thus the data in FIG. 2 is aligned according to the time axis. If one can receive the data as in FIG. 2, the frequency of the incoming signals could be detected by performing a Fast Fourier Transform (FFT) on the data from one antenna with respect to time. Once the primary frequencies are determined, one can find the related amplitudes of the data from the other antennas. An FFT can then be performed on the amplitude values found from the above algorithm. The output of this FFT would give the phase information related to the incoming signals and thus the solution to the AOA problem.

The AOA problem has been solved using multiple receivers, but there a number of calibration issues associated with such a system. For this solution to work, the receivers have to be precisely calibrated. See a related copending patent application by James B. Y. Tsui Ser. No. 08/269,318 filed Jun. 30, 1994, titled "AOA Application of Digital Channelized IFM Receiver". The invention described therein makes use of the principle disclosed in a co-pending patent application by James B. Y. Tsui Ser. No. 08/269,317 filed Jun. 30, 1994, and in a paper by T. W. Fields, D. L. Sharpin and J. B. Tsui titled Digital Channelized IFM Receiver, presented at the IEEE MTT-S International Microwave Symposium, May 24–26, 1994 at San Diego Calif., and published in the Digest of the Symposium. These two copending patent applications and the paper are hereby incorporated by reference.

SUMMARY OF THE INVENTION

An objective of the invention is to provide a solution to the AOA problem which eases some of the constraints imposed by the calibration issue. Another objective is to simplify the hardware design.

The invention relates to a solution to the AOA problem, receiving the data as in FIG. 2, which uses a single receiver and digitizes the incoming signal to solve the problem where there might be multiple signals present. By time-sharing a single receiver and digitizing the incoming signal, one can simplify the hardware design and the calibration issues and still have an efficient system.

DETAILED DESCRIPTION

Figure 2:
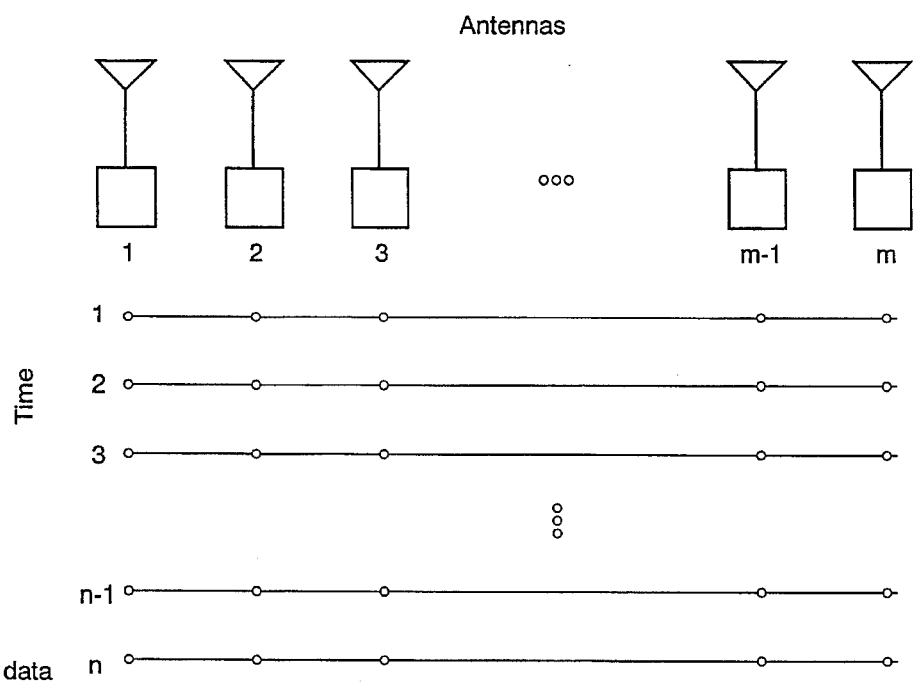
FIG. 2 is a graph showing desired sampled digital data at simultaneous time instants.

1. The invention represent a solution to the AOA problem with the use of a single receiver. To put the incoming signal into digital form, an ADC (Analog-to-Digital Converter) is used at the output of a receiver. The digital data can then be operated by using signal processing techniques to solve the AOA problem. The entire system might look like the system shown in FIG. 3. To get the received data as in FIG. 2, the antennas 311-31m are coupled to a receiver 350 with an ADC 360 attached at its output. A switching network 340 is used to coordinate the time each antenna is sampled in a sequential manner. The output from the ADC 360 is supplied to a signal processor 370, which may use FFT techniques to calculate the AOA, as described in the background references.

2. A problem arises when using the switching network 340 due to the time delay during the switches between antennas. The problem can be averted by using the fact that even though the input lines from the antenna to the receiver look to be the same length to a human, a small difference in length can mean a significant time delay to the receiver. Thus, it is possible to put in delays in the input lines to offset the arrival of the data from the different antennas such that the incoming signal seems to arrive at the same time to the receiver.

3. The delay time in the switching network 340 is governed by the ADC 360. To use the most amount of data that would be available for this problem, it would be appropriate for the switching network 330 to match the sampling time of the converter 350. It is assumed at this time that an ADC can operate at 1 GHz. Using this assumption, one can find the sampling time simply by inverting the frequency.

$$t_s \equiv \frac{1}{1 \text{GHz}} = 1 ns \quad (1)$$

Since this sampling time is to be set equal to the delay time, delay lines of one nanosecond are put into the input lines from the different antennas. Although the speed of light is $3 \times 10^8$ meters/sec, the speed can drop to 60% of its value due to the dielectric nature in a cable. Using a value of $1.8 \times 10^8$ meters/sec for the speed of light, one can solve approximately for the length of wire that will offset an input signal for 1 ns:

$$l_d = \text{delay line length} = (1.8 \times 10^8)(1 \times 10^{-9} s) = 0.18 \text{ meters} \quad (2)$$

It is useful to note that this length of 0.18 meters is not a significant length because it implies that there would be a very low loss due to the insertion of the delay line. Insertion loss is a major issue in the use of wire as a delay.

4. To coordinate the different signals from the subsequent antennas to the initial signal received by the first antenna 311, multiples of the delay line will have to be inserted for the antennas that are further down in sequence. That is, the second antenna 312 will have a line 332 of 1 $l_d$ delay inserted in its path; the third antenna 313 will have a line 333 of 2 $l_d$ delay inserted in its path; the fourth antenna will have a line of 3 $l_d$ delay inserted in its path; and so on. Thus, all m antennas have the incoming signal arrive at the receiver at the same identical time by placing the appropriate delays into the system. This system will generate the data that was desired in FIG. 2. From this data it is possible to use signal processing techniques for solving the AOA problem.

Figure 1:
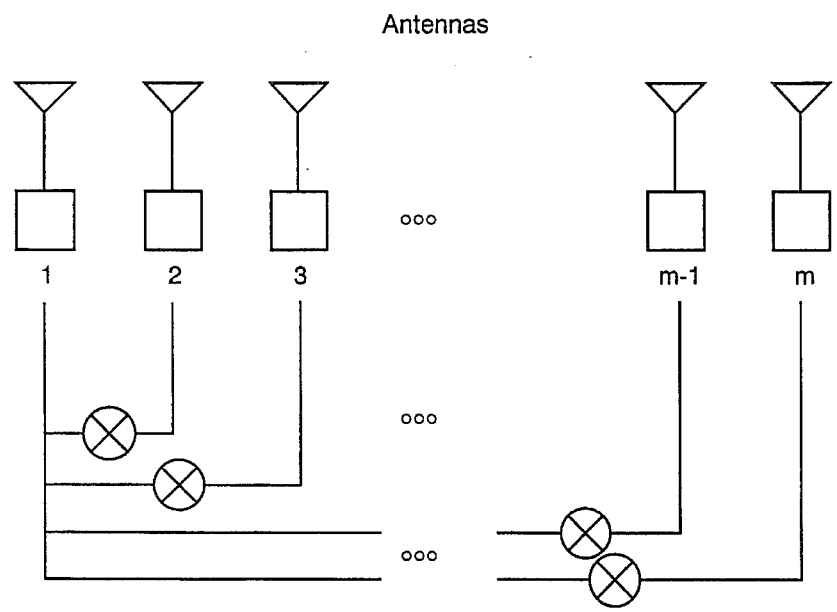
FIG. 1 is a diagram showing an AOA problem solution using multiple receivers of analog signals.

5. It seem that there is another calibration problem that is associated with this problem, in that, it seems that the delay lines must be of exact length such that the signals arrive simultaneously. While this is of some concern, the equipment in a laboratory can handle this issue more readily than recalibrating all the receivers in the first system laid out in FIG. 1. Additionally, it is possible to have the data skewed in time to bypass this concern.

Figure 4:
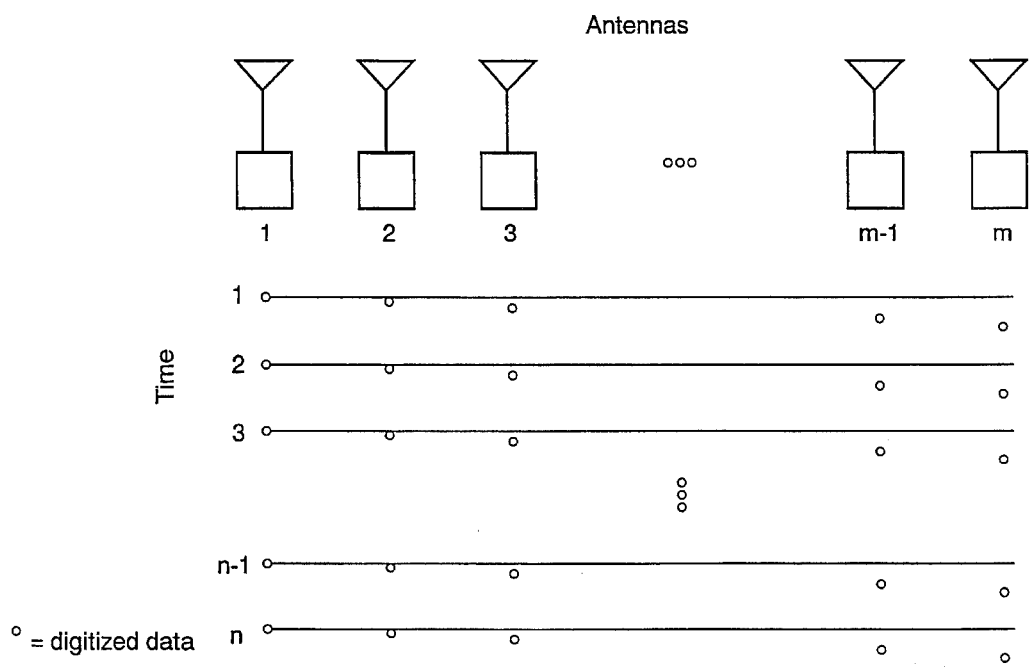
FIG. 4 is a graph showing skewed sampled digital data for a system without delay lines.

6. If all the data input lines were the same length, then the data would not have the same reference time for all the input antennas. The data would be slightly skewed in time since the delays were not compensated. A system without delay lines would produce data that would be similar to that of FIG. 4. Although this is not the same as the desired data as in FIG. 2, digital processing methods would allow us to shift the digitized data in time such that each of the antenna signals could be aligned. The methods involving FFTs described in the background would have to be extended to compensate for this skewed time data. Thus, it is possible to analyze data in this manner and the use of delay lines could be avoided altogether.

7. Conclusion: This invention provides a way to simplify the hardware design and to bypass some of the calibration issues that are involved with aligning the phases of multiple receivers of analog signals. By digitizing the data, it is possible to use signal processing techniques to provide identical results as in processing the analog signals. Additionally, it provides an alternative to handling multiple incoming signals.

The processing can be similar to that described below for a related patent application. The FFT units would be included in the signal processor 370 of FIG. 3.

AOA APPLICATION OF DIGITAL CHANNELIZED IFM RECEIVER

In the related copending patent application by James B. Y. Tsui Ser. No. 08/269,318 filed Jun. 30, 1994, titled "AOA Application of Digital Channelized IFM Receiver", the digital receiver can be used to separate signals according to their input frequencies. The phase relation obtained from the IFM receiver can be used to find the fine frequency of the input signal. However, in this approach, multiple antennas will be used. The phase difference between antennas is used to measure AOA of the input signals.

This approach usually has many antennas and each antenna is followed by a digital channelized IFM receiver. In order to simplify the explanation a two antenna system as shown in the drawing of that application was discussed. The outputs from the two antennas will be digitized and a fast Fourier transform (FFT) will be performed on the data. The FFT outputs derived from signals from the antennas A and B can be written as $I_{ai}(t_j)$, $Q_{ai}(t_j)$, $I_{bi}(t_j)$, $Q_{bi}(t_j)$ where subscripts a,b represent the antennas A and B; i represents the number of output channel from the FFT output; j represents time. The phase relation can be obtained as $$\Theta_{ai}(t_j) = \tan^{-1}\left[\frac{I_{ai}(t_j)}{Q_{ai}(t_j)}\right] \quad (3)$$

$$\Theta_{bi}(t_j) = \tan^{-1}\left[\frac{I_{bi}(t_j)}{Q_{bi}(t_j)}\right]$$

The AOA information can be found from the phase difference between two antennas at the same output channel and the same time. The same channel means the same frequency (or the same signal). Let us find the phase difference between the two channels as $$\delta\Theta_{ab,i}(t_j) = \Theta_{ai}(t_j) = \Theta_{ai}(t_j) - \Theta_{bi}|t_j| \quad (4)$$

If the distance between the two antennas is d and the input frequency is measured f, the conventional phase measurement system can be written as $$\phi = \frac{2\pi d \sin \Psi}{\lambda} \quad (5)$$

where $\phi = \Theta_{ab,i(t_j)}$ is the phase difference between the two antennas, $\Psi$ is the AOA of the input signal, and $\lambda$ is the wavelength. The wavelength is related to the signal frequency as $\lambda=C/f$ where C is the speed of light. Substituting these relations into equation (3), the result is $$AOA = \sin^{-1}\left[\frac{CX\Theta_{ab,i}(t_j)}{2\pi fd}\right] \quad (6)$$

This equation will produce ambiguity, if $d>\lambda/2$. In order to avoid this ambiguity, the antenna separation must be less than $\lambda/2$.

If there are simultaneous signals of different frequencies, the phase difference measured at different frequency channels i.e. different i values, can be used to find the AOA of them. If the phase differences at many different times i.e. different j values, are used to find the AOA, the measurement accuracy can be improved through averaging over time.

Figure 3:
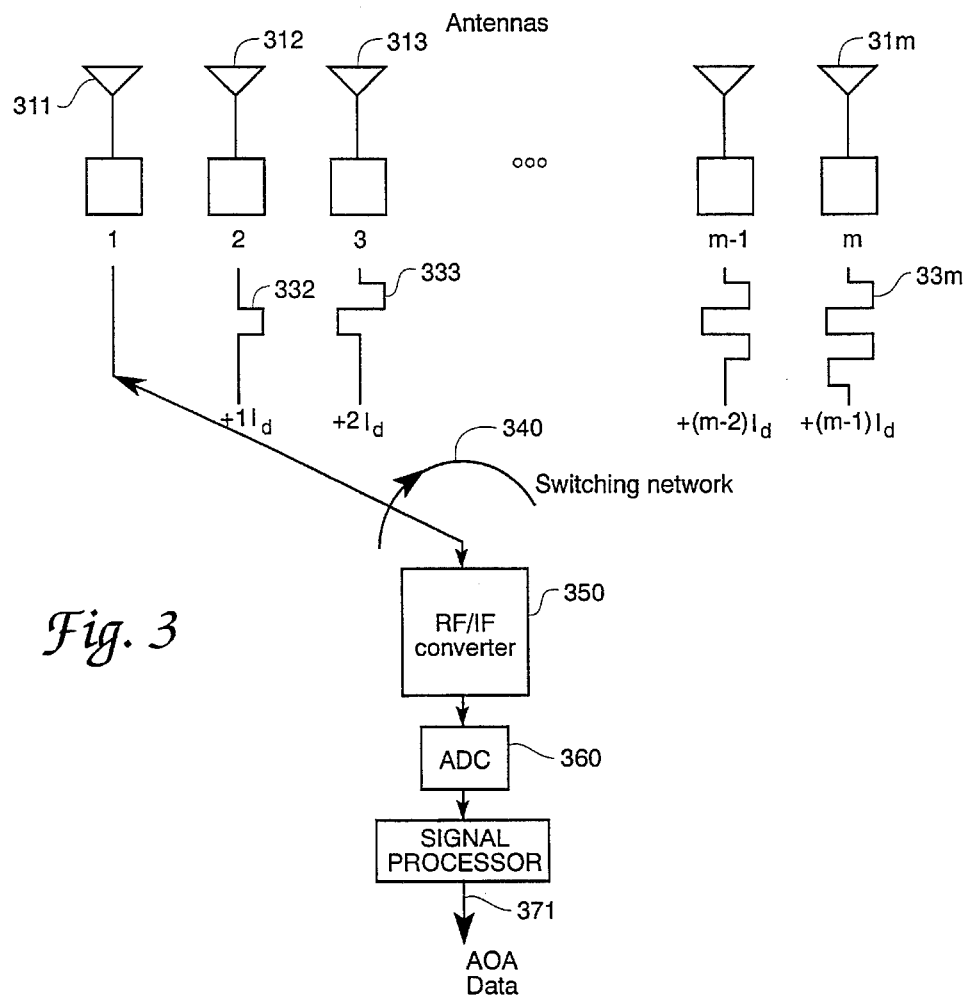
FIG. 3 is a block diagram showing a digitizing receiving system with line delays for matched inputs.

This application can be extended to systems with more than two antennas, for example the m antennas shown in FIG. 3.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. Apparatus for measuring an angle of arrival (AOA) of an incoming signal using m antennas separated from one another by a distance d, m being an integer greater that one, said antennas being coupled via delay line means and a switching means to a single receiver means;

wherein the switching means comprises electronic means to sample the incoming signal as received at the m antennas sequentially in repetitive cycles with a given sampling rate and cycle time, and wherein delays provided by the delay line means is such that the sampled signals for each antenna represent a signal arriving at the antennas at the same instant of time in each cycle;

said receiver means comprising input means for receiving input signals from the switching means and for supplying IF signals to a single analog-to-digital converter means which operates at said given sampling rate to provide digitized samples for each of the m antennas each cycle; and signal processing means coupled to the single analog-to-digital converter means for analyzing the digitized samples and determining to angle of arrival of the incoming signal, wherein the signal processing means includes FFT means.

2. Apparatus according to claim 1, wherein said given sampling rate inverted equals a sampling time for the switching means and the single analog-to-digital converter means, and wherein said sampling time multiplied by a speed of light factor for the delay line means equals a basic delay line length $l_d$;

wherein to coordinate signals from subsequent ones of said antennas to an initial signal received by a first of said antennas, multiples of the basic delay line length are inserted for antennas that are further down in sequence, namely, a second antenna has a line of length $1\,l_d$ delay inserted in its path; a third antenna has a line of length $2\,l_d$ delay inserted in its path; a fourth antenna has a line of length $3\,l_d$ delay inserted in its path; and so on up to a line of length $(m-1)\,l_d$ for an antenna number m, so that all m antennas have the incoming signal arrive at the receiver at the same identical time by placing the appropriate delays into the system.

3. Apparatus for measuring an angle of arrival (AOA) of an incoming signal using m antennas separated from one another by a distance d, m being an integer greater that one, said antennas being coupled via a switching means to a single receiver means;

wherein the switching means comprises electronic means to sample the incoming signal as received at the m antennas sequentially in repetitive cycles with a given sampling rate and cycle time;

said receiver means comprising input means for receiving input signals from the switching means and for supplying IF signals to a single analog-to-digital converter means which operates at said given sampling rate to provide digitized samples for each of the m antennas each cycle; and signal processing means coupled to the single analog-to-digital converter means for shifting the digitized samples in time such that each of the antenna signals are aligned, and for analyzing the digitized samples and determining the angle of arrival of the incoming signal, wherein the signal processing means includes FFT means.

\* \* \* \* \*